June 15, 1926. 1,589,035
F. F. WULF
DRAFT EVENER
Filed May 14, 1925 2 Sheets-Sheet 1
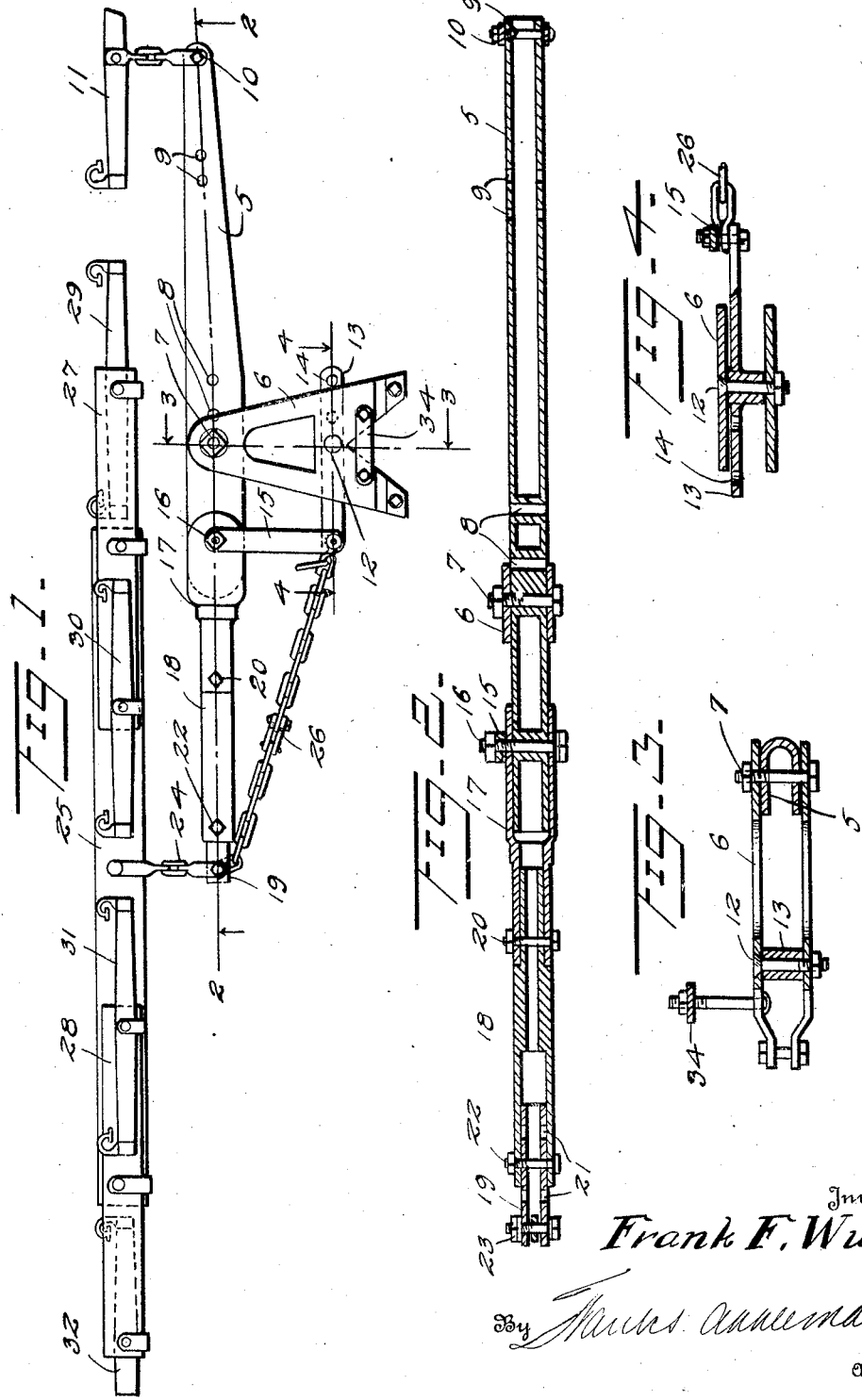
Inventor
Frank F. Wulf.

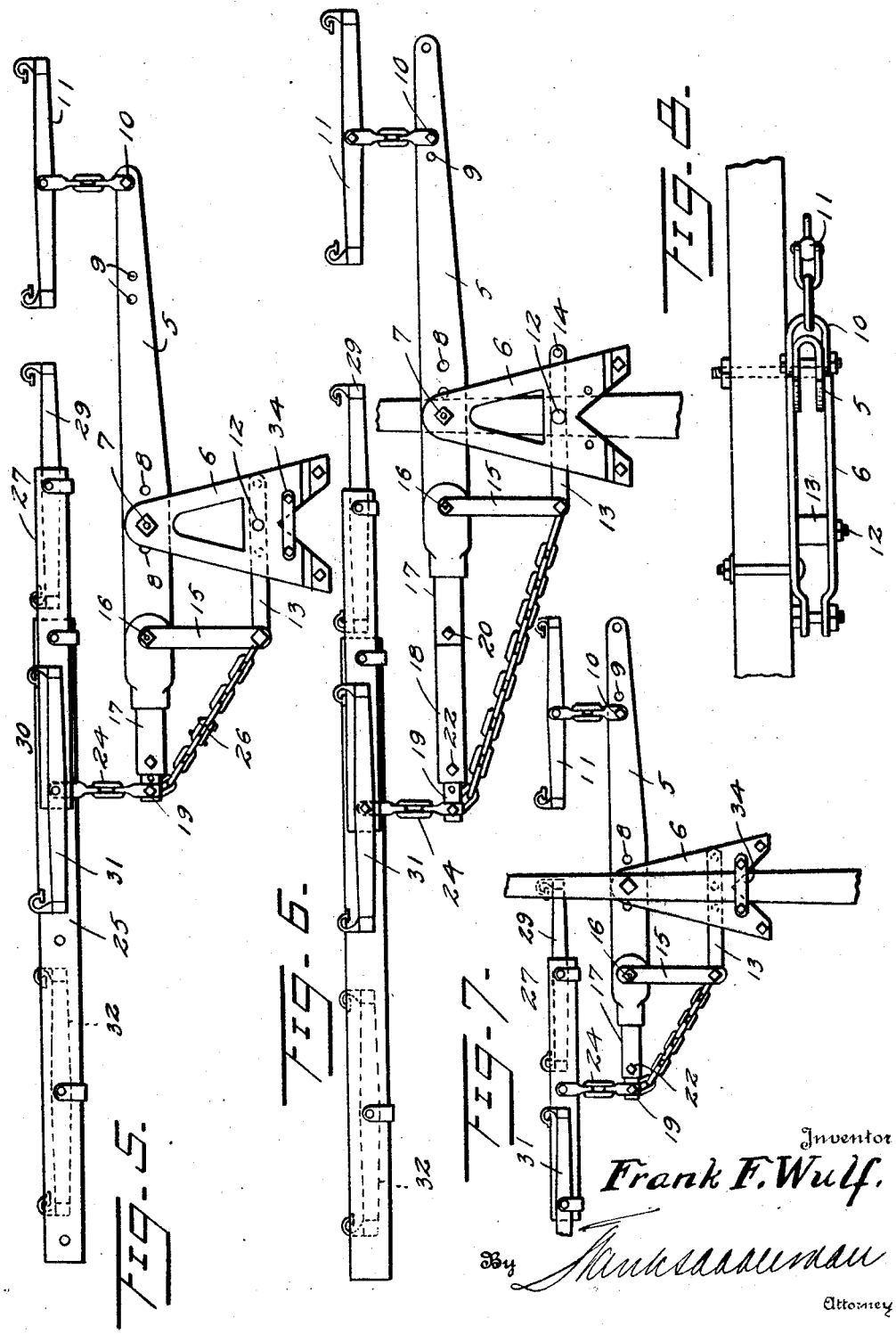

Patented June 15, 1926.

1,589,035

UNITED STATES PATENT OFFICE.

FRANK F. WULF, OF NELIGH, NEBRASKA.

DRAFT EVENER.

Application filed May 14, 1925. Serial No. 30,316.

This invention relates to draft eveners, and particularly to eveners used in connection with horses or other draft animals, and the invention has for an object the production of novel means whereby one horse may be hitched to the draft rigging to one side of an implement such as a plow, to permit the horse on the right hand side to walk in a furrow, while the other horses of a team may travel on unplowed ground; a condition which insures better footing for the horses so that they may work without tiring as they would if they had to walk on plowed ground.

Furthermore, in the employment of the invention when it is applied to a tongue of a vehicle or the like, one horse may occupy a position on one side of the tongue and two or three other horses of a team may occupy positions on the opposite side of the tongue.

Furthermore, it is an object of this invention to produce an evener capable of being expeditiously changed for use in connection with a team of five, four, or three horses.

It is a still further object of this invention to produce an evener of the character indicated which will be efficient and satisfactory in use and comparatively inexpensive to manufacture and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of an evener equipped for use with a five-horse team;

Figure 2 illustrates a sectional view on the line 2—2 of Fig. 1;

Figure 3 illustrates a sectional view on the line 3—3 of Fig. 1;

Figure 4 illustrates a sectional view on the line 4—4 of Fig. 1;

Figure 5 illustrates a plan view of an evener adjusted as a four-horse evener for plows and the like;

Figure 6 illustrates a plan view of an evener applied to a tongue;

Figure 7 illustrates a plan view of the evener applied to a tongue and adjusted as a three-horse evener; and Figure 8 illustrates a view in end elevation of the evener applied to a tongue.

In these drawings, 5 denotes a tree adapted to be connected to a clevis or other hitch 6 through the medium of a pivot or bolt 7. The tree 5 has a plurality of apertures 8 to receive the pivot 7 in order that the tree may be adjusted for leverage according to the number of horses employed as a team. The tree has another set of apertures 9 to receive the bolt or connection 10 by which a swingle tree 11 is connected to the tree at different positions with relation to the pivot 7 for the purpose of equalizing the leverage.

The hitch or clevis 6 has a pivot 12 on which a lever 13 is pivoted, the said lever having apertures such as 14 by which it can be adjusted on the pivot 12, according to the leverage desired, it being shown that the said lever 13 is pivotally connected to a link 15, which link has its end connected to the tree 5 by a pivot 16.

The tree has a plurality of extensions 17, 18 and 19 that may be used collectively or selectively, as will presently appear, for the purpose of adapting the evener for use with teams having different numbers of horses, and to the end just stated, the extension 17 has a bifurcated inner end that receives the end of the tree 5, and the furcations of the extension 17 respectively overlie and underlie the tree and are secured to the tree by the pivot or fastening 16. The extension 17 has a tubular outer end to receive the extension 18 which is likewise tubular, and the extensions 17 and 18 may be secured together by a fastening 20 such as a bolt or the like, so that the said extension 18 may be removed, when desired, for adjusting the evener, as will presently appear. The outer extension 19 is telescopically adjustable in the extension 18, and the said extension 19 is provided with a plurality of apertures 21, any one of which may be positioned to receive the fastening or bolt 22 by which the extension 19 is held at different positions of adjustment in the extension 18.

The extension 19 has a pivot or fastening 23 such as a bolt through the medium of which a link or hitch 24 may connect it with a tree 25, and a preferably flexible element such as a chain 26 connects the outer end of the extension 19 with the lever 13 at its junction with the link 15.

When the evener is to be equipped for five horses, double trees 27 and 28 are pivotally connected to the respective ends of the tree 25, and the tree 27 is provided with swingle trees 29 and 30, whereas the double tree 28 may be provided with swingle trees 31 and 32.

When the evener having the characteristics of the invention just described is to be used with a team of four horses, the clevis, its tree 5, the lever 13, the link 15, the connection 26 and the extensions 17 and 19 are employed, but the parts are adjusted somewhat to equalize the pull exerted by the horses. In the noted instance, the swingle tree 11 is connected to the tree 5 as illustrated in Fig. 1, but the lever 13 would be adjusted to oscillate on the pivot 12 when the pivot is located in the middle hole 14, the extension 18 of the tree 5 would be omitted and the extension 19 would be applied to the tubular portion of the extension 17 and it would be secured when the said extension 19 is inserted in the tubular extension to its full extent. The flexible connection 26 would be therefore shortened, as the distance between the end of the extension 19 and the end of the lever 13 would be greatly reduced. The outer end of the extension 19 would be connected by a hitch such as 24 to a conventional type of three-horse evener and the pivot between the tree 5 and the clevis would be changed from the end hole to the center of the group of holes 8, and when this adjustment is attained, the right hand horse will be in position with relation to a plow to walk in the furrow and the three other horses will travel on unplowed ground in order that the objects desired may be attained.

When an evener having the characteristics of this invention is used on a wagon and where one horse is to travel on one side of the tongue of the wagon and three horses are to travel on the opposite side of the tongue, the device is equipped as shown in Fig. 1 of the drawing, except that a conventional type of three-horse evener is connected to the hitch 24, whereas the clevis is connected to a tongue by the employment of the pivot 7 which extends through the tongue. When this construction is employed, a clamp 34 which is connected to the clevis embraces the tongue in order to hold the clevis rigid that it may not turn to one side or the other. When the adjustment has been made as just described, the swingle tree 11 will be connected to the intermediate hole 9 in the tree 5.

When the evener is to be employed for three horses and the evener is to be applied to a wagon tongue, the pivot 7 is applied to the central hole of the series 8, the swingle tree 11 is connected to the tree 5 at the inner of the series of holes 9, and the outer extension 19 is secured to the inner extension 17, whereas the said outer extension 19 is connected to a conventional type of double tree. Thereafter the flexible connection 26 would be shortened, the lever 13 would be mounted on the pivot 12 through the intermediate or central hole 14 and the clevis would be secured to the tongue by the clamp 34, as described in connection with the attachment of the four-horse evener to a wagon tongue.

From the foregoing description, the manner of carrying the invention into practice for the different uses has been described, and it is believed that one skilled in the art will understand the construction and operation without a résumé thereof.

I claim:

1. In a draft evener, a tree having a plurality of apertures between its ends for receiving a connection to a clevis and a plurality of apertures near one end for receiving a connection to a swingle tree hitch, an extension connected to the said tree at the end opposite the one having the apertures, extensions adapted to be secured together and to the first mentioned extension collectively, a plural tree having connections for swingle trees, a hitch connecting the outermost of the extensions to the plural tree, a clevis, means for pivotally connecting the tree and clevis, a lever adjustably pivoted between its ends to the clevis, a link pivotally connected to one end of the lever and to the first mentioned tree, and a flexible connection between the outermost extension and the end of the lever at its junction with the link.

2. In a draft evener, a tree, a clevis, a connection for coupling the tree to the clevis, the said tree having a plurality of apertures near one end for receiving a connection to a swingle tree hitch, an extension having a bifurcated end embracing an end of the tree opposite the end having the apertures, extensions adapted to be secured together and to the first mentioned extension, the outermost extension being adapted to cooperate with the first mentioned extension without the intermediate extension, a plural hitch, means for connecting the plural hitch to the outermost extension, a lever adjustably pivoted between its ends to the clevis, a link pivotally connected to one end of the lever and to the first mentioned tree, and a flexible connection between the outermost extension and the end of the lever at its junction with the link.

3. In a draft evener, a tree having a plurality of apertures between its ends for receiving a connection to a clevis and a plurality of apertures near one end for receiving a connection to a swingle tree hitch, an extension connected to the said tree at the end opposite the one having the apertures extensions telescopically connected together and to the first mentioned extension, a plural tree having connections for swingle trees, a hitch connecting the outermost of the extensions to the plural tree, a clevis, means for pivotally connecting the tree and clevis, a lever adjustably pivoted between its ends to the clevis, a link pivotally connected to one end of the lever and to the first mentioned tree, and a flexible connection between the outermost extension and the end of the lever at its junction with the link.

4. In a draft evener, a tree having a plurality of apertures between its ends for receiving a connection to a clevis and a plurality of apertures near one end for receiving a connection to a swingle tree hitch, an extension connected to the said tree at the end opposite the one having the apertures, extensions telescopically connected together and to the first mentioned extension, a plural tree having connections for swingle trees, a hitch connecting the outermost of the extensions to the plural tree, a clevis, means for pivotally connecting the tree and clevis, a lever adjustably pivoted between its ends to the clevis, a link pivotally connected to one end of the lever and to the first mentioned tree, a flexible connection between the outermost extension and the end of the lever at its junction with the link, means for pivotally connecting the first mentioned tree to a tongue of a wagon, and means for holding the clevis on the tongue.

FRANK F. WULF.